United States Patent
Ishii et al.

(10) Patent No.: US 6,985,292 B2
(45) Date of Patent: Jan. 10, 2006

(54) POLARIZING PLATE AND LIQUID-CRYSTAL DISPLAY CONTAINING THE SAME

(75) Inventors: Yoshinori Ishii, Moriyama (JP); Takao Uesugi, Nakakubiki-gun (JP); Koichi Watanabe, Joetsu (JP)

(73) Assignees: Gunze Co., Ltd., Kyoto (JP); Poratechno Co., Ltd., Niigata (JP)

( * ) Notice: Subject to any disclaimer, the term of this patent is extended or adjusted under 35 U.S.C. 154(b) by 243 days.

(21) Appl. No.: 10/149,448

(22) PCT Filed: Dec. 28, 2000

(86) PCT No.: PCT/JP00/09415

§ 371 (c)(1),
(2), (4) Date: Jun. 27, 2002

(87) PCT Pub. No.: WO01/48518

PCT Pub. Date: Jul. 5, 2001

(65) Prior Publication Data

US 2003/0048396 A1    Mar. 13, 2003

(30) Foreign Application Priority Data

Dec. 28, 1999    (JP) ................................ 11-373680

(51) Int. Cl.
*G02B 27/28*    (2006.01)
*G02B 5/30*    (2006.01)
(52) U.S. Cl. ...................... 359/490; 359/491
(58) Field of Classification Search ............... 359/490, 359/491; 264/1.35; 428/422, 500, 516, 428/421
See application file for complete search history.

(56) References Cited

U.S. PATENT DOCUMENTS

| | | | | |
|---|---|---|---|---|
| 4,416,946 A | * | 11/1983 | Bolt | 428/421 |
| 5,033,825 A | * | 7/1991 | Ishikawa et al. | 349/102 |
| 2004/0223221 A1 | * | 11/2004 | Sugimura et al. | 359/490 |

FOREIGN PATENT DOCUMENTS

| | | |
|---|---|---|
| JP | 5-212828 | 8/1993 |
| JP | 7-77608 | 3/1995 |
| JP | 7-294732 | 11/1995 |
| JP | 10-130402 | 5/1998 |
| JP | 11-142645 | 5/1999 |
| JP | 2000-266932 | 9/2000 |
| JP | 2000-266935 | 9/2000 |
| JP | 2000-321430 | 11/2000 |
| JP | 2000-321432 | 11/2000 |
| JP | 2001-108826 | 4/2001 |
| WO | WO 97/47467 | * 12/1997 |

* cited by examiner

*Primary Examiner*—Leonidas Boutsikaris
(74) *Attorney, Agent, or Firm*—Westerman, Hattori, Daniels & Adrian, LLP

(57) ABSTRACT

A polarizing plate with a drop in polarization efficiency, hue shift, and light leakage do not substantially occur under a high humidity/high temperature environment, and a liquid crystal display device utilizing the same are provided. The polarizing plate of the present invention includes a polyvinyl-alcohol-based polarizing film wherein after being subjected to an atmosphere of 80° C. and 90% RH for 24 hours, the retention of the polarization efficiency is 0.97 or more, the retention of the luminance is 3.0 or less, and an absolute value for the amount of change in value "a" is 0.6 or less and an absolute value for the amount of change in value "b" is 1.0 or less, according to the Hunter-Lab method. A liquid crystal display device of the present invention includes such a polarizing plate affixed thereto.

2 Claims, 2 Drawing Sheets

1 Glass Substrate
2 Binder
4 Polarizer

1  Glass Substrate
2  Binder
4  Polarizer (a)

(b)

POLARIZING PLATE AND LIQUID-CRYSTAL DISPLAY CONTAINING THE SAME

TECHNICAL FIELD

The present invention relates to a polarizing plate, particularly to a polarizing plate having high durability and high polarization efficiency that is useful for liquid crystal display devices, and to a liquid crystal display device having such a polarizing plate attached thereto. More specifically, the invention relates to an improvement in a polarizing plate for practically preventing drop in polarization efficiency, hue shift, and light leakage even under a high humidity/high temperature environment.

BACKGROUND ART

A conventional polarizing plate with high polarization efficiency is generally such that a cellulose-triacetate-based (hereinafter, referred to as TAC) film, which serves as a protective film, is laminated on a polarizing film in which iodine or a dichroic dye is adsorbed and oriented in a polyvinyl-alcohol-based (hereinafter, referred to as PVA) film, with an aqueous solution of PVA resin, which serves as an adhesive, in a state of wet or semidry flowability However, since the water absorption and water vapor permeability of TAC is high, in a polarizing plate using TAC for the protective film, deterioration in polarization performance under a high humidity/high temperature environment, specifically, drop in polarization efficiency, hue shift, and light leakage under crossed nicols, has been significant.

In order to overcome these problems, polarizing plates that use a film made of a resin with low water absorption and low water vapor permeability for the protective film have been proposed.

For example, Japanese Unexamined Patent Publication No. 7-77608 discloses a polarizing plate such that a film serving as a protective film and made of a thermoplastic saturated norbornene-baed resin is adhered to a PVA-based polarizing film using an acrylic-based adhesive or a polyester-isocyanate-based adhesive. After such a polarizing plate is subjected to an environment of 80° C. and 90% RH for 500 hours, the polarization efficiency is 95% or higher and the single transmissivity is 38% or higher.

In addition, Japanese Unexamined Patent Publication 7-294732 discloses a polarizing plate such that a film having a photoelastic coefficient of $25.0 \times 10^{-13}$ cm$^2$/dyne or less, for example, a film made of an amorphous polyolefin such as Zeonex, or polymethyl methacrylate, serves as a support for a polarizing element film, and the support is adhered to the polarizing element film using an acrylic-based adhesive. After such a polarizing plate is subjected to an environment of 60° C. and 90% RH for 100 hours, the pyschometric lightness is small.

However, although these polarizing plates are able to suppress a drop in polarization efficiency under a wet heat environment, it cannot be said that suppression of hue shift and light leakage is sufficiently realized.

DISCLOSURE OF THE INVENTION

In view of the foregoing and other problems, it is an object of the present invention to provide a polarizing plate with which, not only suppression of a drop in polarization efficiency is achieved, but also with which hue shift and light leakage do not substantially arise, under a high temperature/high humidity environment.

A polarizing plate of the present invention comprises a polyvinyl-alcohol-based polarizing film, wherein after subjecting the polarizing film to an atmosphere of 80° C. and 90% RH for 24 hours, the retention of polarization efficiency is 0.97 or more, the amount of light leakage is 3.0 or less, and an absolute value for the amount of change in value "a" is 0.6 or less and an absolute value for the amount of change in value "b" is 1.0 or less, according to the Hunter-Lab method.

A liquid crystal display device of the present invention comprises the said polarizing plate. To be more specific, the liquid crystal display device above described comprises a pair of substrates arranged so as to face each other, a liquid crystal layer sandwiched between the pair of substrates, a means for applying a voltage to the liquid crystal layer, and the above described polarizing plate affixed to at least one side of each of the substrates.

The polarization efficiency as referred to in the present invention denotes that measured according to a method described later, using a spectrophotometer. The retention of the polarization efficiency is a value obtained by dividing the polarization efficiency of the polarizing plate after subjecting to an atmosphere of 80° C. and 90% RH for 24 hours by the polarization efficiency of the polarizing plate before subjecting. A closer numerical value to 1 indicates better humidity/heat resistance.

The retention of the polarization efficiency of the polarizing plate of the present invention is 0.97 or more, and preferably 0.99 or more. When the retention of the polarization efficiency is less than 0.97, deterioration in polarization performance under a high humidity/high temperature environment is caused.

Light leakage as referred to in the present invention denotes a phenomenon such that in-plane luminance changes when two polarizing plates arranged to have a crossed nicols relation are placed in a wet heat environment. The amount of light leakage is a value measured by a method described later.

The amount of light leakage of the present invention is 3.0 or less, preferably 2.5 or less, and more preferably 2.0 or less. When the amount of light leakage is over 3.0, light leakage actually occurs under a high humidity/high temperature environment. When a liquid crystal display employing polarizing plates that generate light leakage is used for a long period, light leaks at the edges of the display when black is displayed, and thereby display contrast deteriorates.

Hue as referred to in the present invention is a value "a" and a value "b" for a single polarizing plate measured according to the Hunter-Lab method. The absolute values of values obtained by subtracting values "a" and "b" after subjecting the polarizing plate to an atmosphere of 80° C. and 90% RH for 24 hours, from values "a" and "b" before subjecting are referred to as the absolute values for the amount of change in values "a" and "b", respectively. A smaller value indicates a smaller hue shift.

In the present invention, the absolute value for the amount of change in a value "a" is 0.6 or less, preferably 0.5 or less, and more preferably 0.4 or less. The absolute value for the amount of change in a value "b" is 1.0 or less, preferably 0.9 or less, and more preferably 0.8 or less. When either the absolute value for the amount of change in a value "a" or the absolute value for the amount of change in a value "b" is not within such a range, hue shift subsequently occurs under a high humidity/high temperature environment. When a liquid crystal display device employing polarizing plates with which hue shift arises is used for a long period, the hue of the display changes and contrast deteriorates.

The polarizing film utilized in the present invention is produced by uniaxially stretching a film made of PVA or a derivative thereof, and subsequently, adsorbing iodine, carrying out a boric acid solution treatment, and drying the film while under tension. Such a film also may be produced by immersing a film made of PVA or a derivative thereof in an aqueous solution of iodine such that the iodine is adsorbed, and subsequently, uniaxially stretching and orienting the film in a boric acid solution and drying the film while under tension. Polarizing films that utilizes dichroic dyes, such as those that are azo-based, anthraquinone-based, and tetrazine-based, instead of iodine are fabricated in the same manner as well.

The polarization efficiency of a polarizing film obtained in such a manner is preferably, 95.0% or higher, more preferably, 99.0% or higher, and even more preferably, 99.7% or higher.

In order to make the retention of the polarization efficiency of the polarizing plate 0.97 or more, it is preferable to laminate a protective film having low water vapor permeability and low water absorption on at least one side of the polarizing film. Examples for a resin which forms a protective film include polypropylene, high-density polyethylene, and a cyclic-olefin-based resin. Of these, a protective film mainly composed of a cyclic-olefin-based resin is preferably used in view of mechanical strength, light transmissivity, and the like.

Known additives such as ultraviolet absorbers, organic or inorganic antiblocking agents, slip additives, antistatic agents, and stabilizers may be added appropriately to the protective films.

The method of forming a protective film is not particularly limited, it being possible to employ methods such as solution casting, extrusion, and calendering.

The thickness of the protective film is commonly 5–150 $\mu$m, preferably 10–100 $\mu$m, and more preferably 30–70 $\mu$m. When thickness is too thin, a film tends to be difficult to handle and when thickness is too thick, the amount of change in optical in-plane retardation tends to be large.

Cyclic-olefin-based resin mentioned above is used as a general term, specific examples (a) to (d) being shown below.

(a) polymers that are ring-opening (co-)polymers of cyclic olefin with hydrogen added as needed (b) (co-)polymers with cyclic olefin attached (c) random copolymers of cyclic olefin and an $\alpha$-olefin such as ethylene or propylene (d) graft modified substances that result when the above (a) to (c) are modified with unsaturated carboxylic acid or derivatives thereof The cyclic olefin is not particularly limited, examples including norbornene, tetracyclododecene, and derivatives thereof (for example, substances containing a carboxyl group or an ester group).

In the case of employing solution casting, examples for a solvent used include alicyclic hydrocarbons such as cyclohexane and cyclohexene and derivatives thereof, as well as aromatic hydrocarbons such as toluene, xylene, and ethyl benzene and derivatives thereof.

In order to make the amount of light leakage 3.0 or less, it is preferable to use a protective film in which the amount of change in optical in-plane retardation is 5 nm or less. The amount of change in optical in-plane retardation was obtained as follows. As shown in FIG. 2(a), a protective film 3 cut to a size length×width=100 mm×100 mm was attached to a glass substrate 1 with a binder 2 made of acrylester-based base resin and an isocyanate-based curing agent. The optical in-plane retardation was then measured in each of nine sections divided as shown in FIG. 2(b), and the average value $R_0$ was obtained. After then subjecting this to an 80° C. atmosphere for 24 hours, the optical in-plane retardation was measured in the same nine sections, and the average value R was obtained. The difference between R and $R_0$ (R–$R_0$) was taken to be the amount of change in optical in-plane retardation.

For the most part, the amount of change in optical in-plane retardation is dependent on distortion of molecular chains in the protective film and on residual shrinkage percentage.

When production of a protective film is realized by solution casting, distortions in the molecular chains arise in the drying step. In addition, residual shrinkage percentage is affected by the orientation of the resin when the solution is stretched on a metal drum or an endless belt, by the orientation of the resin caused by pulling tension in the drying step, and by the residual solvent.

When production of a protective film is realized by extrusion, distortions in the molecular chains arise during cooling and hardening with a chill roll after extrusion from an extruder. In addition, residual shrinkage percentage is affected by the draw during extrusion from the extruder and by the orientation of the resin caused by pulling tension from the point of cooling and hardening to the point of winding.

The amount of change in optical in-plane retardation of the protective film can be made to be 5 nm or less by suitable methods such as correcting distortions in molecular chains in the protective film and reducing the residual shrinkage percentage.

For example, methods of correcting distortions of molecular chains and of reducing the residual shrinkage percentage include heating the film under a minus draw before winding the film and leaving the loosely wound film in a heat chamber. In the case of employing solution casting for production, leaving the film in a drying oven for a long period is one method of reducing the residual solvent, preferably until none remains. Adding preferably 0.1–20% by weight, more preferably 0.5–10% by weight, and even more preferably 1–5% by weight with respect to resin of a plasticizer such as dioctyl phthalate, dioctyl adipate, or isodecyl adipate to the casting solution before hand is another method. Because the drying time required for practically eliminating the residual solvent is reduced by ⅕–1/20 when a plasticizer is added, such a method is advantageous from the perspective of productivity and cost of equipment. The advantageous effects of adding a plasticizer are conjectured to be as follows. That is, it is thought that solvent that enters into gaps between resin molecules does not easily evaporate, but when a plasticizer is added, the plasticizer enters into the gaps so as to discharge the solvent from the gaps.

The residual shrinkage percentage necessary in order to make the amount of change in optical in-plane retardation of the protective film 5 nm or less is such that surface shrinkage percentage according to a measuring method described later is preferably 0.8% or less, more preferably 0.5% or less, and even more preferably, 0.3% or less.

In order to make the absolute value for the amount of change in a value "a" 0.6 or less, preferably 0.5 or less, and more preferably 0.4 or less, and the absolute value for the amount of change in a value "b" 1.0 or less, preferably 0.9 or less, and more preferably 0.8 or less, it is necessary to suppress reversion in the alignment of the polarizing film under a high humidity/high temperature environment. To realize this, it is preferable that an adhesive solution (including an emulsion) used in laminating have sufficient wetting property to the polarizing film and protective film and sufficient adhesive strength after drying.

It is desirable to employ a surface treatment so that the wetting tension of the surface of the protective film to be laminated with the polarizing film is 500 µN/cm (23° C.) or more, and preferably 550 µN/cm (23° C.) or more. Examples for a surface treatment include a corona discharge treatment, an ultraviolet irradiation treatment, and a chemical treatment. The corona discharge treatment or ultraviolet irradiation treatment may be carried out in air or in an atmosphere of nitrogen or a rare gas.

It is also desirable to apply an anchor coat on surface of the protective film to be laminated with the polarizing film. Examples for an anchor coat agent include an urethane-based, acrylic-based, and epoxy-based resin solutions (including emulsions). Of these, polyurethane-based resin solution made of polyester polyol and polyisocyanate is preferably used.

In addition, for an adhesive for laminating the polarizing film and the protective film, it is desirable to use an adhesive in which the solution thereof (including an emulsion) has sufficient wetting property to the polarizing film and the protective film as well as sufficient adhesive strength after drying. Examples for an adhesive include PVA-based, acrylic-based, and epoxy-based resin solutions. Of these, it is more preferable to adhere the polarizing film and the protective film with a PVA-based aqueous solution in a wet or semidry state. PVA-based substance is mainly composed of a resin that is obtained by carrying out a saponification treatment on vinyl acetate resin. It is preferable that the degree of polymerization be 1000–3000 and that the degree of saponification be 80% or higher and more preferable that the degree of polymerization be 1500–3000 and the degree of saponification be 99% or higher. Other monomers such as monomers copolymerized appropriately with a small amount of acrylic acid, crutonic acid, itaconic acid, and the like or monomers modified by alkyl groups, epoxy groups, or the like may be used. It is also desirable to add in a PVA-based aqueous solution a substance that induces reactive curing with the PVA, such as plyisocyanate, boric acid, and epoxy resin.

Figure 1:
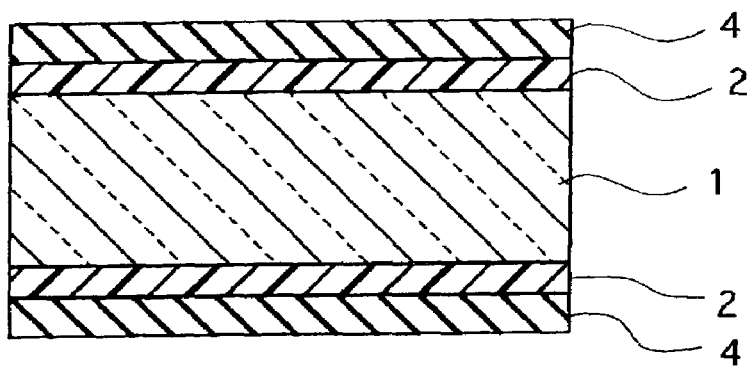
FIG. 1(a) is lateral view of the arrangement of a polarizing plate when in-plane luminance of the polarizing plate is measured.
FIG. 1(b) is a plan view of the same.
Figure 1:
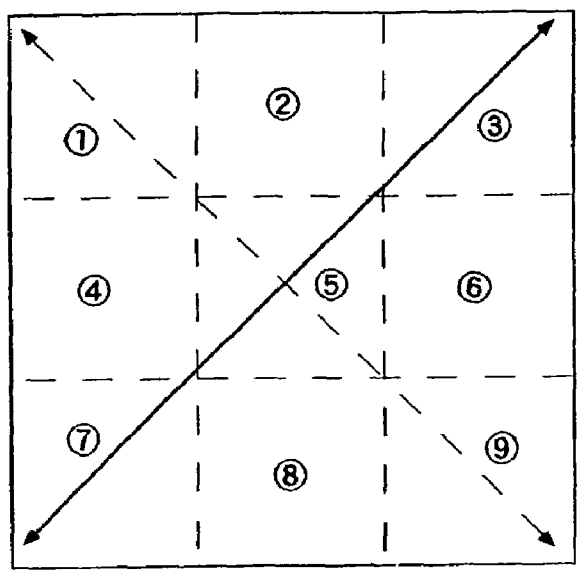

DESCRIPTION OF THE REFERENCE NUMERALS 1 glass substrate
2 binder
3 protective film
4 polarizing plate

BEST MODE FOR CARRYING OUT THE INVENTION

In the following, typical examples of the present invention are described along with comparative examples. The method of measuring and the method of evaluating physical properties employed in the present invention are as follows.

Water absorption was measured at 23° C. for 24 hrs. using an ASTM D570.

Water vapor permeability was measured at 40° C. and 90% RH using the Mocon test (Permatran-W600 water permeability measurement device available from Mocon, Inc.).

Wetting tension was measured in compliance with JIS-K6768.

Figure 2:
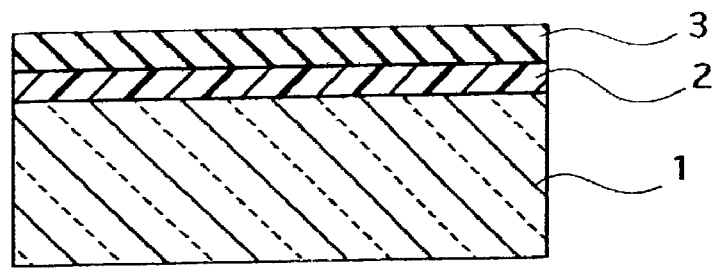
FIG. 2(a) is a lateral view of the arrangement of a polarizing plate when in-plane optical retardation is measured.
FIG. 2(b) is a plan view of the same.
Figure 2:
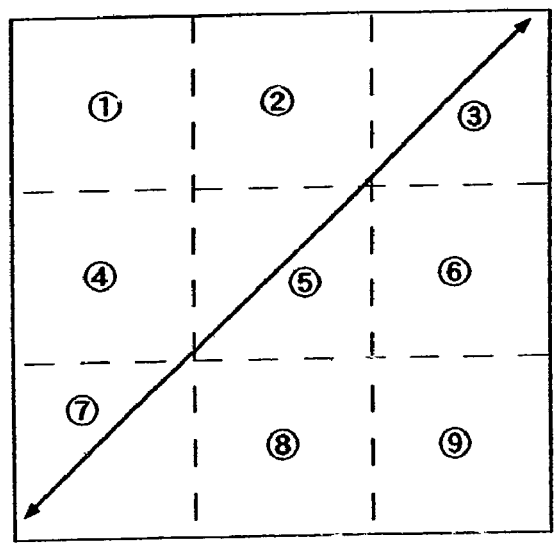

The amount of change in optical in-plane retardation was measured using the following method. Specifically, as shown in FIG. 2(a), a protective film 3 cut to a size length×width=100 mm×100 mm is adhered to a glass substrate 1 with a binder 2 made of acrylester-based base resin and an isocyanate-based curing agent interposed. Using a birefringence analyzer (Kobra automated birefringence analyzer available from Oji Keisoku, Inc.), optical in-plane retardation was then measured in each of nine sections divided as shown in FIG. 2(b), and the average value $R_0$ was obtained. After then subjecting this to an 80° C. atmosphere for 24 hours, the optical in-plane retardation was measured in the same nine sections, and the average value R was obtained. The difference between R and $R_0$ ($R-R_0$) was taken to be the amount of change in optical in-plane retardation. Note that an arrow shown in FIG. 2(b) indicates the length of the protective film 3.

The surface shrinkage percentage was measured using the following method. Specifically, a single protective film was cut to a size length×width=100 mm×100 mm, and after subjecting the film to an 80° C. atmosphere for 100 hours, the surface shrinkage percentage was determined from Equation (1) below, where M is the length (mm) and T is the width (mm).

$$\text{Surface Shrinkage Percentage} (\%) = \{(100 \times 100) - (M \times T)\} \div (100 \times 100) \times 100 \quad (1)$$

The polarization efficiency of polarizing plates was determined using the following method. Specifically, two polarizing plates were arranged on top of one another so that the polarization axes were oriented in the same direction, and $T_1$ was taken to be the average value for light transmissivity measured continuously from a wavelength of 400 nm to a 700 nm using a spectrophotometer. Two polarizing plates were then arranged so that the polarization axes were perpendicular to one another, and $T_2$ was taken to be the average value for light transmissivity measured in the same manner. Polarization efficiency was thus determined from Equation (2) below. A higher numerical value indicates better polarization performance.

$$\text{polarization efficiency} (\%) = \sqrt{\frac{T_1 - T_2}{T_1 + T_2}} \times 100 \quad (2)$$

The single transmissivity of a polarizing plate is the average value for the light transmissivity of one polarizing plate measured continuously from a wavelength of 400 nm to a 700 nm using a spectrophotometer. A higher numerical value indicates better transparency of the polarizing plate.

The humidity and heat resistance test of the polarization efficiency of the polarizing plates was carried out using the method below. Specifically, a polarizing plate was subjected to an atmosphere of 80° C. and 90% RH for 24 hours. The retention of the polarization efficiency is a value obtained by dividing the polarization efficiency after the test by the polarization efficiency before the test. A higher numerical value indicates better humidity and heat resistance.

Measurement and evaluation of hue shift were carried out using the following method. Specifically, using SZ-Σ80II available from Nippon Electric Industries Co., Ltd., a value "a" and a value "b" were measured before and after subjecting the polarizing plate to an atmosphere of 80° C. and 90% RH for 24 hours according to the Hunter-Lab method. A smaller absolute value for the amount of change in value "a" and "b" before and after subjecting indicates a smaller hue shift.

Amount of light leakage was evaluated using the in-plane luminance of a polarizing plate. Measurement and evaluation of the in-plane luminance of a polarizing plate are carried out as follows. Specifically, as shown in FIG. 1(a), two polarizing plates 4 of dimensions 100 mm×100 mm cut from a long polarizing plate at an angle of 45° with respect to the polarization axis were adhered to either side of a glass substrate 1 with a binder 2 interposed so that the polarization axes were perpendicular to one another, and this structure was subject to an atmosphere of 80° C. and 90% RH for 24 hours. Subsequently, this structure was arranged on a backlight (Fuji Color Light Box 5000 available from Fuji Color Trading Co., Ltd.), the light source from the backlight was set to 100% reference value, and luminance was measured in each of nine sections divided as shown in FIG. 1(b) using a luminance meter (LS-100 available from Minolta Co., Ltd.). Using the resulting values, the amount of light leakage as shown by Equation (3) below was determined. In this case, a closer numerical value to 1 indicates less light leakage.

In addition, light leakage was visually evaluated.

$$\text{Amount of Light Leakage} = \left(\text{Avarage Luminance of } ②④⑥⑧\right) \div \left(\text{Avarage Luminance of } ①③⑤⑦⑨\right) \quad (3)$$

Note that arrows shown in FIG. 1(b) indicate the polarizing axes of the polarizing plates.

EXAMPLE 1

After dissolving 25 parts by weight of cyclic-olefin-based resin (Zeonor 1600R available from Zeon Corporation) in 75 parts by weight of a mixed solvent of xylene, cyclohexane, and toluene (1:1:1 mixing ratio by weight), a film was fabricated by solution casting. Both sides of the resulting film were then subjected to a corona discharge treatment at a treatment intensity of 100 W/m2/min in air, and a mixed solution of polyester polyol (Seikadyne LB available from Dainichiseika Color and Chemicals Mfg. Co., Ltd.) and polyisocyanate (Seikadyne 3500A available from Dainichiseika Color and Chemicals Mfg. Co., Ltd.) (1:11 mixing ratio by weight) was coated on one surface of the film so that the thickness after drying was 0.2 µm and allowed to dry. Thus, a protective film with an anchor coat agent coated thereon having a thickness of 50 µm, a width of 550 mm, and a length of 200 m was obtained. (Note that, immediately before winding the film, hot air at a temperature of 120° C. was introduced to the film for 10 seconds while the film was under a draw ratio of −0.2% between rollers, and distortions of molecular chains in the cyclic-olefin-based resin were thereby corrected and the residual shrinking percentage was reduced.)

The water absorption of the protective film obtained in such a manner was 0.01%, the water vapor permeability was 3.0 g/m$^2$/24 hours, and wetting tension was 600 µN/cm (23° C.). The residual amount of solvent, the surface shrinkage percentage, and the optical in-plane retardation $R_0$, R, and R−$R_0$ are shown in Table 1.

EXAMPLE 2

A PVA film (Kuraray vinylon film VF-9X75R available from Kuraray Co., Ltd., thickness 75 µm) was immersed for 5 minutes in an aqueous solution that is 5000 parts by weight of water, 35 parts by weight of iodine, and 525 parts by weight of potassium iodide such that the iodine was adsorbed. After then uniaxially stetching the film in the longitudinal direction to about 4.4 times in a 4% by weight of aqueous solution of boric acid having a temperature of 45° C., the film was dried while under tension to obtain a polarizing film.

Next, the following process was carried out. The polarizing film and the pair of protective films obtained in Example 1 were arranged on top of one another with a 5% aqueous solution of PVA interposed therebetween serving as an adhesive and with the anchor coat sides of the protective films facing either side of the polarizing film. The aqueous solution of PVA had an average degree of polymerization of 1800 and a degree of saponification of 99%. The structure was then secured between a rubber roller and a metal roller (the rubber roller has a diameter of 200 mm, the metal roller has a diameter of 350 mm, line pressure is 10 kg/cm) and wound in such a manner that the thickness of an adhesive layer that results after drying 1 µm. The structure was left in the wound state (length of 100 m) for 24 hours in a chamber having a temperature of 40° C. The results of the evaluation of the resulting polarizing plate are shown in Table 2.

EXAMPLE 3

Protective films were obtained in the same manner as in Example 1, except that a solution of 30 parts by weight of cyclic-olefin-based resin (Zeonex 490K available from Zeon Corporation), 1 part by weight of plasticizer (isodecyl adipate available from Kao Corporation) dissolved in 69 parts by weight of xylene was used for the casting solution.

The water absorption of the protective films obtained in such a manner was 0.01%, the water vapor permeability was 2.9 g/m$^2$/24 hours, and wetting tension was 600 µN/cm (23° C.). The residual amount of solvent, the surface shrinkage percentage, and the optical in-plane retardation $R_0$, R, and R−$R_0$ are shown in Table 1.

A polarizing plate was obtained in the same manner as Example 2 using these protective films. The results of the evaluation of the polarizing plate are shown in Table 2.

EXAMPLE 4

Using a cyclic-olefin-based resin (Zeonex 490K available from Zeon Corporation), a film having a thickness of 50 um was obtained by the extrusion molding with T-die (a T-die method), and protective films were obtained in the same manner as Example 1 by employing a corona discharge treatment and applying an anchor coat (extrusion temperature of 300° C., take-up roller surface temperature of 130° C., immediately before winding the film, hot air at a temperature of 125° C. was introduced to the film for 10 seconds while the film was under a draw ratio of −0.2% between rollers).

The water absorption of the protective films obtained in such a manner was 0.01%, the water vapor permeability was 3.0 g/m²/24 hours, and wetting tension was 600 μN/cm (23° C.). The residual amount of solvent, the surface shrinkage percentage, and the optical in-plane retardation $R_0$, R, and $R-R_0$ are shown in Table 1.

Meanwhile, a polarizing film was obtained by the following method. Specifically, a PVA-based film (Kuraray vinylon film VF-9X75R available from Kuraray Co., Ltd., thickness 75 μm) was uniaxially stretched in the longitudinal direction to 3.4 times (change in thickness) by rolling the film between heated metal rollers (temperature of 110° C., diameter of 350 mm, pressure of 170 kg/cm), and both ends of the film were trimmed off by approximately 10 mm respectively. The film was again uniaxially stretched to 1.2 times (change in thickness) between heated metal rollers (temperature of 110° C., diameter of 350 mm, pressure of 190 kg/cm). The film was then immersed for 30 seconds in an aqueous solution of iodine (a solution in which 18 parts by weight of iodine and 288 parts by weight of potassium iodide are dissolved in 3600 parts by weight of water) while under tension and excess was removed using a squeezing roller. The film was then immersed in a 60° C. aqueous solution of boric acid (a solution in which 600 parts by weight of boric acid, 3 parts by weight of iodine, and 48 parts by weight of potassium iodide are dissolved in 12000 parts by weight of water) for 5 seconds while under tension, and excess was removed using a squeezing roller. Finally, the film was dried while under tension, whereby a polarizing film was obtained.

A polarizing plate was then obtained in the same manner as Example 2 using the polarizing film and the protective films described above, except that a mixture of a 5% PVA aqueous solution having an average degree of polymerization of 1500 and a degree of saponification of 86%, and polyisocyanate (Aquanate 100 available from Nippon Polyurethane Industry Co., Ltd.) (10:1 mixing ratio by weight) was used for the adhesive.

The results of the evaluation of the polarizing plate are shown in Table 2.

TABLE 1

| | Units | Example 1 | Example 3 | Example 4 |
|---|---|---|---|---|
| Residual amount of solvent | ppm | 1,000 | 0 | 0 |
| Surface shrinkage percentage | % | 0.12 | 0.05 | 0.16 |
| In-plane retardation $R_0$ | nm | 0.2 | 0.2 | 0.3 |
| R | nm | 3.7 | 0.3 | 4.5 |
| $R-R_0$ | nm | 3.5 | 0.1 | 4.2 |

TABLE 2

| | Units | Example 2 | Example 3 | Example 4 |
|---|---|---|---|---|
| Single Transmissivity | % | 41.9 | 41.9 | 42.6 |
| Polarization efficiency | % | 99.9 | 99.9 | 99.9 |
| Retention of polarization efficiency | — | 1.00 | 1.00 | 1.00 |

TABLE 2-continued

| | | Units | Example 2 | Example 3 | Example 4 |
|---|---|---|---|---|---|
| Hue b | Initial value | — | 2.23 | 2.31 | 2.73 |
| | Amount of Change | — | +0.65 | +0.53 | +0.16 |
| Hue a | Initial value | — | −0.70 | −0.68 | −0.78 |
| | Amount of Change | — | −0.19 | −0.27 | −0.04 |
| Amount of light leakage | | — | 1.54 | 1.29 | 1.68 |
| Visual Evaluation of Light Leakage | | — | None | None | None |

COMPARATIVE EXAMPLE 1

A polarizing plate was obtained in the same manner as Example 1 and Example 2, except that a corona discharge treatment and an anchor coat were not applied to the protective films and an emulsion-type, 2-part epoxy acrylic-based adhesive (the base resin is E-Tec Emulsion AE943 (52% solid content by weight) available from Japan Synthetic Rubber Co., Ltd. and the curing agent is Aquanate 100 (100% solid content by weight) available from Nippon Polyurethane Industry Co., Ltd., base resin: curing agent=10:1 mixing ratio by weight) was used for the adhesive. The results of the evaluation of this polarizing plate are shown in Table 4.

COMPARATIVE EXAMPLE 2

Protective films having differing amounts of change in optical in-plane retardation were fabricated using the same casting solution as that employed in Example 1. The residual amount of solvent, the surface shrinkage percentage, and the optical in-plane retardation $R_0$, R, and $R-R_0$ are shown in Table 3. Using the protective films, a polarizing plate was then obtained in the same manner as Example 2. The results of the evaluation of this polarizing plate are shown in Table 4.

COMPARATIVE EXAMPLE 3

Protective films having different amounts of change in optical in-plane retardation were fabricated using the same casting solution as that employed in Example 3. The residual amount of solvent, the surface shrinkage percentage, and the optical in-plane retardation $R_0$, R, and $R-R_0$ are shown in Table 3. Using the protective films, a polarizing plate was then obtained in the same manner as Example 2. The results of the evaluation of this polarizing plate are shown in Table 4.

TABLE 3

| | Units | Comparative Example 2 | Comparative Example 3 |
|---|---|---|---|
| Residual amount of solvent | ppm | 8,000 | 0 |
| Surface shrinkage percentage | % | 1.05 | 1.50 |
| In-plane retardation | | | |
| $R_0$ | nm | 0.9 | 3.3 |
| R | nm | 10.2 | 14.7 |
| $R-R_0$ | nm | 9.3 | 11.4 |

TABLE 4

| | Units | Comparative Example 1 | Comparative Example 2 | Comparative Example 3 |
|---|---|---|---|---|
| Single Transmissivity | % | 41.9 | 41.9 | 41.9 |
| Polarization efficiency | % | 99.9 | 99.9 | 99.9 |
| Retention of polarization efficiency | — | 1.00 | 1.00 | 1.00 |
| Hue b    Initial value | — | 2.23 | 2.26 | 2.32 |
| Amount of Change | — | +2.49 | +0.65 | +0.56 |
| Hue a    Initial value | — | −0.70 | −0.71 | −0.68 |
| Amount of Change | — | +0.69 | −0.26 | −0.31 |
| Retention of Luminance | — | 2.60 | 6.91 | 7.40 |
| Visual Evaluation of Light Leakage | — | Small Amount | Yes | Yes |

INDUSTRIAL APPLICABILITY

The present invention makes it possible to provide a polarizing plate having high durability and high polarization efficiency with which the three factors that contribute to a degradation in liquid crystal display performance under a high humidity/high temperature environment, drop in polarization efficiency, hue shift, and light leakage, substantially do not occur.

What is claimed is:

1. A polarizing plate comprising:

a protective film, 5 to 150 μm thick, composed of cyclic-olefin-based resin having an anchor coat agent applied at least on one of the surfaces of the resin, and wherein:

the optical in-plane retardation of said protective film is 5 nm or less after said protective film is subjected to an 80° C. atmosphere for 24 hours, a polyvinyl-alcohol-based polarizing film located facing said anchor coat agent; and a polyvinyl-alcohol-containing adhesive layer adhering the anchor-coat-agent-applied surface of said protective film and said polyvinyl-alcohol-based polarizing film, wherein:

the polarization efficiency of the polarizing plate after being subjected to an atmosphere of 80° C. and 90% relative humidity for 24 hours is restricted to 0.97 or more with respect to the polarization efficiency of the polarizing plate before being subjected to an atmosphere of 80° C. and 90% relative humidity for 24 hours;

the amount of light leakage of the polarizing plate after being subjected to an atmosphere of 80° C. and 90% relative humidity for 24 hours is restricted to 3.0 or less with respect to the amount of light leakage of the polarizing plate before being subjected to an atmosphere of 80° C. and 90% relative humidity for 24 hours; and an absolute value for the amount of change in value "a" is restricted to 0.6 or less according to a Hunter-Lab method after the polarizing plate is subjected to an atmosphere of 80° C. and 90% relative humidity for 24 hours, and an absolute value for the amount of change in value "b" is restricted to 1.0 or less according to said Hunter-Lab method after the polarizing plate is subjected to an atmosphere of 80° C. and 90% relative humidity for 24 hours.

2. A liquid crystal display device comprising:

a pair of substrates opposed to each other;

a liquid crystal layer enclosed between the pair of substrates;

voltage applying means for applying voltage to the liquid crystal layer; and a polarizing plate according to claim 1, the polarizing plate being attached to at least one of the pair of substrates.

* * * * *